United States Patent
Peterson et al.

(10) Patent No.: US 10,382,523 B2
(45) Date of Patent: Aug. 13, 2019

(54) MULTIMEDIA ALBUM PUBLICATION TO MEDIA SERVER

(75) Inventors: Eric Peterson, Fort Collins, CO (US); Philip M. Walker, Fort Collins, CO (US); James Louis Long, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 2094 days.

(21) Appl. No.: 13/054,805

(22) PCT Filed: Sep. 30, 2008

(86) PCT No.: PCT/US2008/078285
§ 371 (c)(1),
(2), (4) Date: Jan. 19, 2011

(87) PCT Pub. No.: WO2010/039127
PCT Pub. Date: Apr. 8, 2010

(65) Prior Publication Data
US 2011/0125879 A1    May 26, 2011

(51) Int. Cl.
*G06F 16/40*    (2019.01)
*H04L 29/06*    (2006.01)
*H04L 29/08*    (2006.01)

(52) U.S. Cl.
CPC .............. *H04L 67/06* (2013.01); *G06F 16/40* (2019.01); *H04L 67/02* (2013.01); *H04L 67/34* (2013.01); *H04L 65/4084* (2013.01)

(58) Field of Classification Search
CPC ......... H04L 67/06; H04L 67/34; H04L 67/02; H04L 65/4084; G06F 16/40
See application file for complete search history.

(56) References Cited

U.S. PATENT DOCUMENTS 6,601,057 B1    7/2003    Underwood et al.
6,732,332 B1    5/2004    Borysewicz et al.
(Continued)

FOREIGN PATENT DOCUMENTS

| CN | 1652602 A | 8/2005 |
| KR | 10-2000-0054715 A | 9/2000 |
| KR | 10-2006-0022800 A | 3/2006 |

OTHER PUBLICATIONS

Neufeld et al., "Server Based Flow Control in a Distributed Continuous Media Server", In The 5th International Workshop on Network and Operating System Support for Digital Audio and Video, 1996, pp. 1-5.*
(Continued)

*Primary Examiner* — Patrice L Winder
*Assistant Examiner* — Angela M Widhalm De Rodrig
(74) *Attorney, Agent, or Firm* — HPI Patent Department (57) ABSTRACT

A system for distributing multimedia files 312 using a media server 112 and corresponding method thereof are described. The system comprises a processing device 302; a network interface 306; and a storage device 310. The storage device 310 comprises: a set of multimedia files 312; and a set of executable instructions 314 which cause the processing device 302 to receive a multimedia file 312; update a website to comprise the received multimedia file 312 for distribution to a web client in response to receipt of the multimedia file 312; update a streaming content to comprise the received multimedia file 312 for distribution to a streaming client in response to receipt of the multimedia file 312; and respond to received requests for the received multimedia file 312.

17 Claims, 6 Drawing Sheets

(56) References Cited

U.S. PATENT DOCUMENTS

| | | | |
|---|---|---|---|
| 8,145,704 B2* | 3/2012 | Marcus | H04N 7/17318 370/230 |
| 2006/0087941 A1* | 4/2006 | Obradovich | 369/47.12 |
| 2006/0259589 A1 | 11/2006 | Lerman et al. | |
| 2008/0140719 A1* | 6/2008 | Chaney | G06F 17/30053 |
| 2008/0189617 A1* | 8/2008 | Covell et al. | 715/738 |
| 2008/0316031 A1* | 12/2008 | Kalama et al. | 340/572.1 |
| 2009/0019006 A1* | 1/2009 | Kim et al. | 707/3 |
| 2009/0150480 A1* | 6/2009 | Xia et al. | 709/203 |
| 2009/0150481 A1* | 6/2009 | Garcia et al. | 709/203 |
| 2009/0150520 A1* | 6/2009 | Garcia et al. | 709/219 |
| 2009/0150570 A1* | 6/2009 | Tao et al. | 709/249 |

OTHER PUBLICATIONS

Peterson, Eric, et al.; "Notification of Transmittal of the International Search Report and Written Opinion of the International Searching Authority or the Declaration"; dated Jun. 22, 2009; cited in priority Appl. No. PCT/US2008/078285 filed Sep. 30, 2009; 11 pages.

Extended Search Report received in EP Application No. 08824115.3, dated Jan. 7, 2014, 6 pgs.

* cited by examiner

MULTIMEDIA ALBUM PUBLICATION TO MEDIA SERVER

BACKGROUND

Different web-based photo sites organize photos in a logical album structure. These sites are typically limited to web site only users, with occasional integrations around photo print purchasing.

Meanwhile, home media users typically will have a Universal Plug and Play (UPnP) media server that provides content to a variety of devices in their home. The content served by these servers is typically done by examining files in a directory of a certain type, e.g., music, video, or photo files.

Problematically, for photos to be available through both mechanisms, the files must be copied in two places: the directory being used by the UPnP media server, and the photo web site.

DESCRIPTION OF THE DRAWINGS

One or more embodiments are illustrated by way of example, and not by limitation, in the figures of the accompanying drawings, wherein elements having the same reference numeral designations represent like elements throughout and wherein.

DETAILED DESCRIPTION

Figure 1:
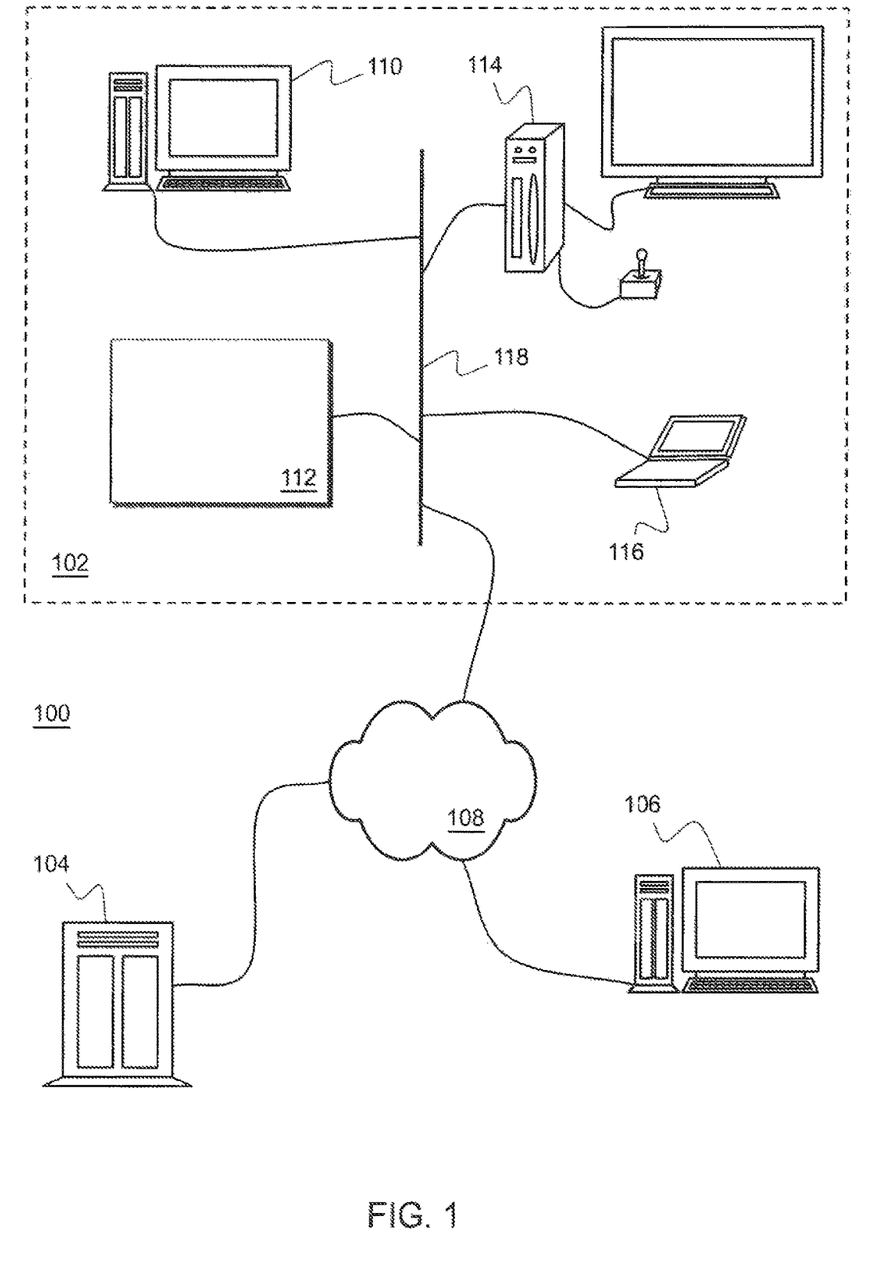
FIG. 1 is a high-level functional block diagram of a network layout in which a sharing system according to an embodiment may be used to advantage.

FIG. 1 depicts a high-level functional block diagram of a network layout 100 comprising a user's home network 102 (dashed line) communicatively coupled to a network server 104 and another secondary computer system 106 via a network 108 such as the packet-switched network commonly referred to as the Internet.

User's home network 102 may be located within or adjacent a user's residence and may comprise either or both of wired and wireless connections. In at least some embodiments, user's home network 102 may be a business and/or retail network.

Home network 102 comprises a computer system 110 (alternatively referred to as the user's personal computer, the users PC, or a primary computer system), a network attached storage-based media server 112 (alternatively referred to as NAS device, media server, or NAS media server), a remote device 114, and a second computer system 116 communicatively coupled via a network 118.

Figure 2:
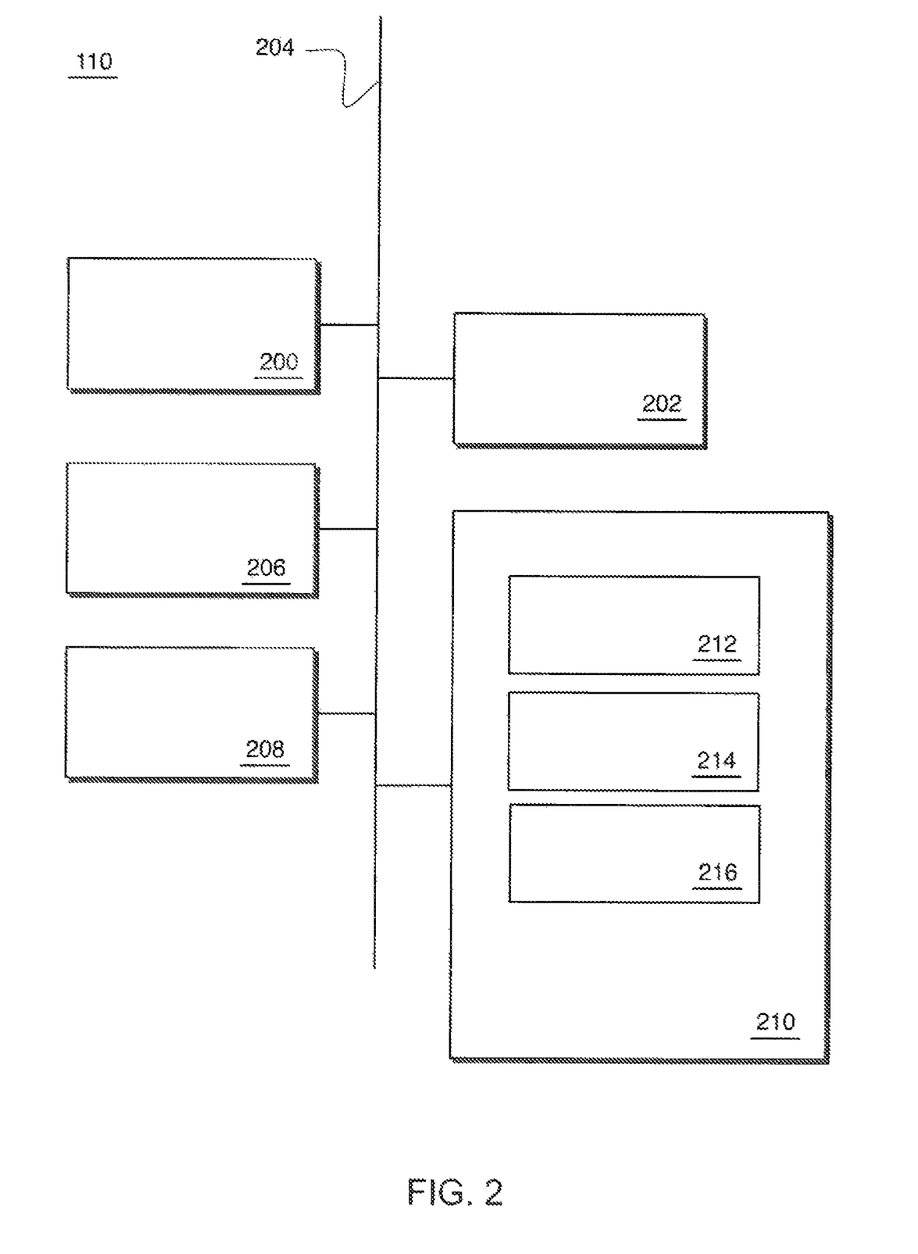
FIG. 2 is a high-level functional block diagram of computer system according to an embodiment.

FIG. 2 depicts a high-level functional block diagram of computer system 110 usable in conjunction with one or more embodiments. Computer system 110 comprises a processor 200, a memory 202, a network interface (I/F) 206, a storage device 210, and an input/output device 208 communicatively coupled via a bus 204 or other interconnection communication mechanism.

Memory 202 (also referred to as a computer-readable medium) may comprise a random access memory (RAM) or other dynamic storage device, coupled to the bus 204 for storing data and instructions to be executed by processor 200. Memory 202 also may be used for storing temporary variables or other intermediate information during execution of instructions to be executed by processor 200. Memory 202 may also comprise a read only memory (ROM) or other static storage device coupled to the bus 204 for storing static information and instructions for the processor 200.

Network I/F 206 comprises a mechanism for connecting to network 118 (FIG. 1). In at least some embodiments, computer system 110 comprises more than a single network interface. In at least some embodiments, network I/F 206 may comprise a wired and/or wireless connection mechanism.

A storage device (alternatively referred to as storage 210), such as a magnetic disk, optical disk, or electromagnetic disk, may also be provided and coupled to the bus 204 for storing data such as one or more photo files 212, audio files 214, or video files 216, and other data and/or instructions.

I/O device 208 may comprise an input device, an output device and/or a combined input/output device for enabling user interaction. An input device may comprise, for example, a keyboard, keypad, mouse, trackball, trackpad, and/or cursor direction keys for communicating information and commands to processor 200. An output device may comprise, for example, a display, a printer, a voice synthesizer, etc. for communicating information to a user. In at least some embodiments, I/O device 208 may comprise a serial and/or parallel connection mechanism for enabling the transfer of one or more of photo files 212, music files 214, or video files 216.

Figure 3:
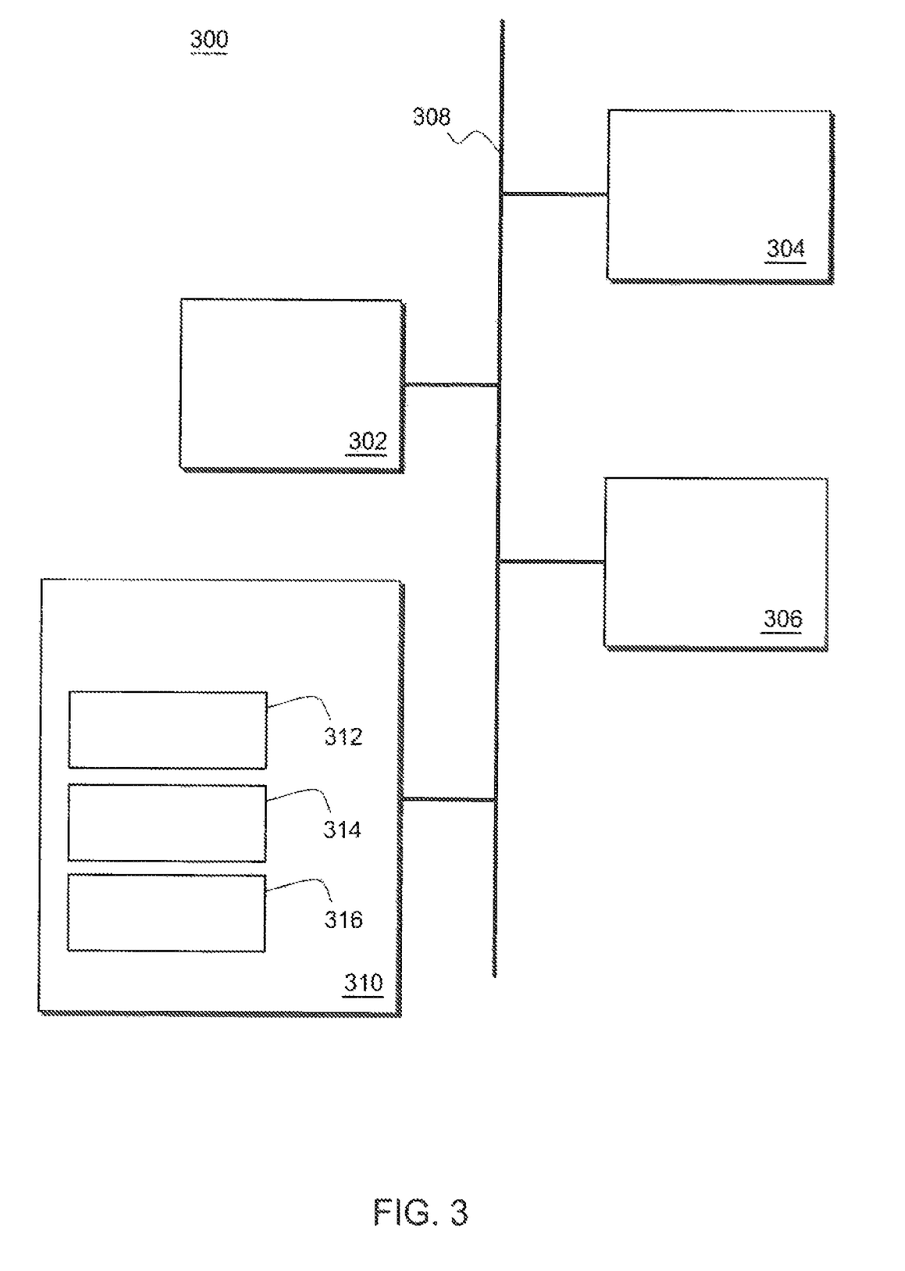
FIG. 3 is a high-level functional block diagram of a media server according to an embodiment.

FIG. 3 depicts a high-level functional block diagram of NAS media server 112 usable in conjunction with one or more embodiments.

Media server 112 is a computing system comprising memory for storing multimedia files and a set of instructions comprising functionality for communicating with other devices such as computer system 110, secondary computer system 116, and network server 104 and with remote devices such as remote device 114, i.e., game systems, and/or digital media adapters. In at least some embodiments, remote devices comprise devices which convert digital media, e.g., multimedia files such as photos, videos, and/or music files, Jar output to a consumer interface device such as a display or monitor and/or a high-fidelity sound system, e.g., a Tivo media device available from TIVO of Alviso, Calif., an Xbox gaming device available from MICROSOFT of Redmond, Wash., etc.

In at least some embodiments, media server 112 comprises functionality for communicating with a user at computer system 110, e.g., via a browser or other interface. Media server 112 is arranged to store a plurality of multimedia files, e.g., video files such as movies, television shows, audio files such as music albums, tracks, sounds, etc., and photo files, and transmit one or more of the stored multimedia files in either a copy transfer or a streaming transfer. In at least some embodiments, media server 112 comprises functionality for generating a web site based on the multimedia files and responding to requests for files of the web site, i.e., serving the web site to requesting devices. In at least some embodiments, media server 112 comprises functionality for transferring a copy of one or more multimedia files to network server 104 for further processing, e.g., a photo publishing site transfer, etc.

In at least one embodiment, media server 112 is a NAS device and comprises a storage medium such as a hard drive in combination with a processing device. Media server 112 also comprises memory for storing instructions for execution by the processing device. Media server 112 is configured as a network attached storage device which comprises functionality for communicating with other user devices, such as general purpose computer systems. Media server 112 is accessed by user devices for storing and retrieving files and transmits requests and receives files from media server 112 and accessed by devices such as remote device 114 for streaming of files to the remote device.

Media server 112, in at least one embodiment, is a self-contained processing device connected to a network such as user's home network 118, with the sole purpose of supplying file-based data storage services to other devices on the network. Operating system and other software on media server 112 provide the functionality of data storage, file system, and access to files, and the management of such functionalities. In at least some embodiments, media server 112 is not designed to carry out general-purpose computing tasks. In at least some embodiments, media server 112 does not have a keyboard or display, and is controlled and configured over the home network, e.g., by connecting a browser to the network address of media server 112.

In at least some embodiments, media server 112 does not contain a general-purpose operating system. In at least some embodiments, minimal-functionality or stripped-down operating systems are used to control media server 112.

In at least one embodiment, media server 112 contains one or more hard disks, often arranged into logical, redundant storage containers or RAID arrays (redundant arrays of inexpensive/independent disks).

In at least some embodiments, media server 112 uses file-based protocols such as network file system (NFS) or server message block (SMB).

FIG. 3 depicts a high-level functional block diagram of an embodiment 300 of media server 112 as a processing device for executing a set of instructions. Embodiment 300 comprises a processing device 302, a memory 304, and a network interface (I/F) device 306 each communicatively coupled with a bus 308. Memory 304 (also referred to as a computer-readable medium) is coupled to bus 308 for storing data, e.g., multimedia files and/or web site files, and instructions to be executed by processing device 302. Memory 304 also may be used for storing temporary variables or other intermediate information during execution of instructions to be executed by processing device 302. In at least some embodiments, memory 304 comprises one or more magnetic, optical, or charge-based data storage media, e.g., a hard disk, for storing multimedia files. Memory 304 may also comprise a read only memory (ROM) or other static storage device coupled to bus 308 for storing static information and instructions for processing device 302.

Network I/F device 306 may comprise at least one of a wired connection or a wireless connection for enabling communication with other networked devices, e.g., via network 118.

Embodiment 300 also comprises a storage device 310 such as one or more hard drives for storing multimedia files and file requests. In at least some embodiments, storage device 310 comprises a greater amount of storage than is present on a desktop computer system. In at least some embodiments, storage device 310 comprises a greater amount of storage than is present on a laptop and/or portable computer system. In at least some embodiments, storage device 310 comprises an amount of storage exceeding 1 Terabytes (TB). In at least some embodiments, storage device 310 comprises an amount of storage exceeding 2 TB. In at least some embodiments, storage device 310 comprises an amount of storage sufficient to store a plurality of movie files.

Storage device 310 stores zero or more multimedia files 312, a sharing and streaming control system (SSCS) 314, and preferences 316. Multimedia files 312 comprise zero or more photo files, audio files, and/or video files.

In at least one embodiment, media server 112 is a computer system similar to the computer system depicted in FIG. 2.

Computer system 110 and second computer system 116 may also be referred to as web clients in that the systems comprise functionality such as web browsers enabling the systems to access a website created and served by NAS media server 112. In at least some embodiments, secondary computer system 106 may also be referred to as a web client depending on the configuration of networks 108, 118 and media server 112. Remote device 114 may also be referred to as a streaming client in that the system comprises functionality enabling the system to access streaming content on media server 112.

Figure 4:
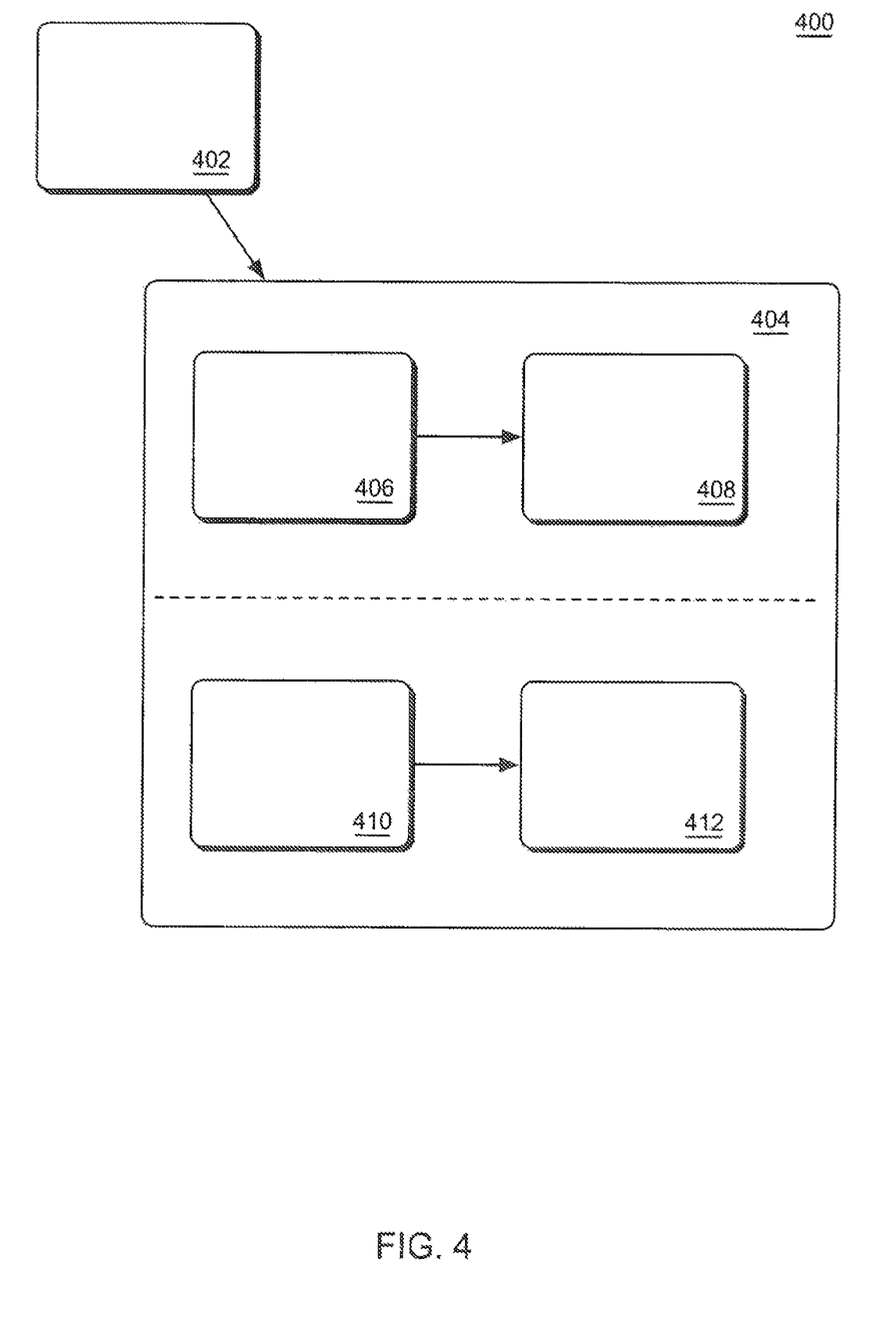
FIG. 4 is a high-level functional block diagram of a portion of sharing and streaming functionality according to an embodiment.

FIG. 4 is a high-level functional process flow diagram of at least a portion 400 of sharing and streaming control system 314 according to an embodiment. Portion 400 comprises a set of instructions for execution by processing device 302 to cause the processing device to perform the functionality specified by FIG. 4.

Process flow portion 400 begins at receive file functionality 402 wherein execution of a set of instructions by processing device 302 causes the processing device to receive one or more files, e.g. multimedia files such as photo files, audio files, and/or video files, from computer system 110. Responsive to receipt of the files, processing device 302 of NAS media server 112 stores the files in storage device 310.

In at least some embodiments, receive file functionality 402 also comprises receiving updated files from computer system 110. For example, updated files may comprise modified versions of previously received files, e.g., rotated, color corrected, or other adjusted files.

The flow of control proceeds to update functionality 404 wherein the processing device 302 updates or creates a website for sharing the received multimedia files and updates or creates a setup for streaming multimedia files to remote devices. In at least some embodiments, processing device 302 may execute a pair of threads for performing the update functionality. In accordance with this embodiment, the flow of control proceeds to update website functionality 406 followed by handle web request functionality 408 in one thread and, in another thread, the flow of control proceeds to update streaming file functionality 410 followed by handle stream request functionality 412.

During update website functionality 406, processing device 302 updates or creates a website, as appropriate, using the received multimedia files from computer system 110. In at least some embodiments, a standard uniform resource locator (URL) is generated and provided to computer system 110 in response to the received multimedia files. In at least some embodiments, an electronic message, e.g. an e-mail or text message, may be generated and transmitted to an address of any user of computer system 110 based on preferences 316.

After creation or update of the website, the flow of control proceeds to handle web request functionality 408 wherein processing device 302 responds to web requests for the website content from other devices such as secondary computer system 116.

During update streaming file functionality 410, processing device 302 updates the content available to be streamed to a remote device, such as remote device 114. In at least some embodiments, the updating of the content available to be streamed to the remote device is determined based on a received user input, e.g., a user selection of a checkbox on a graphical user interface. In at least some embodiments, updating of the content occurs automatically based on a predetermined setting, e.g., periodically, responsive to receipt of content, etc.

After update of the content available to be streamed, the flow of control proceeds to handle stream request functionality 412 wherein the processing device 302 responds to stream requests for the available streaming content from remote devices such as remote device 114.

Figure 5:
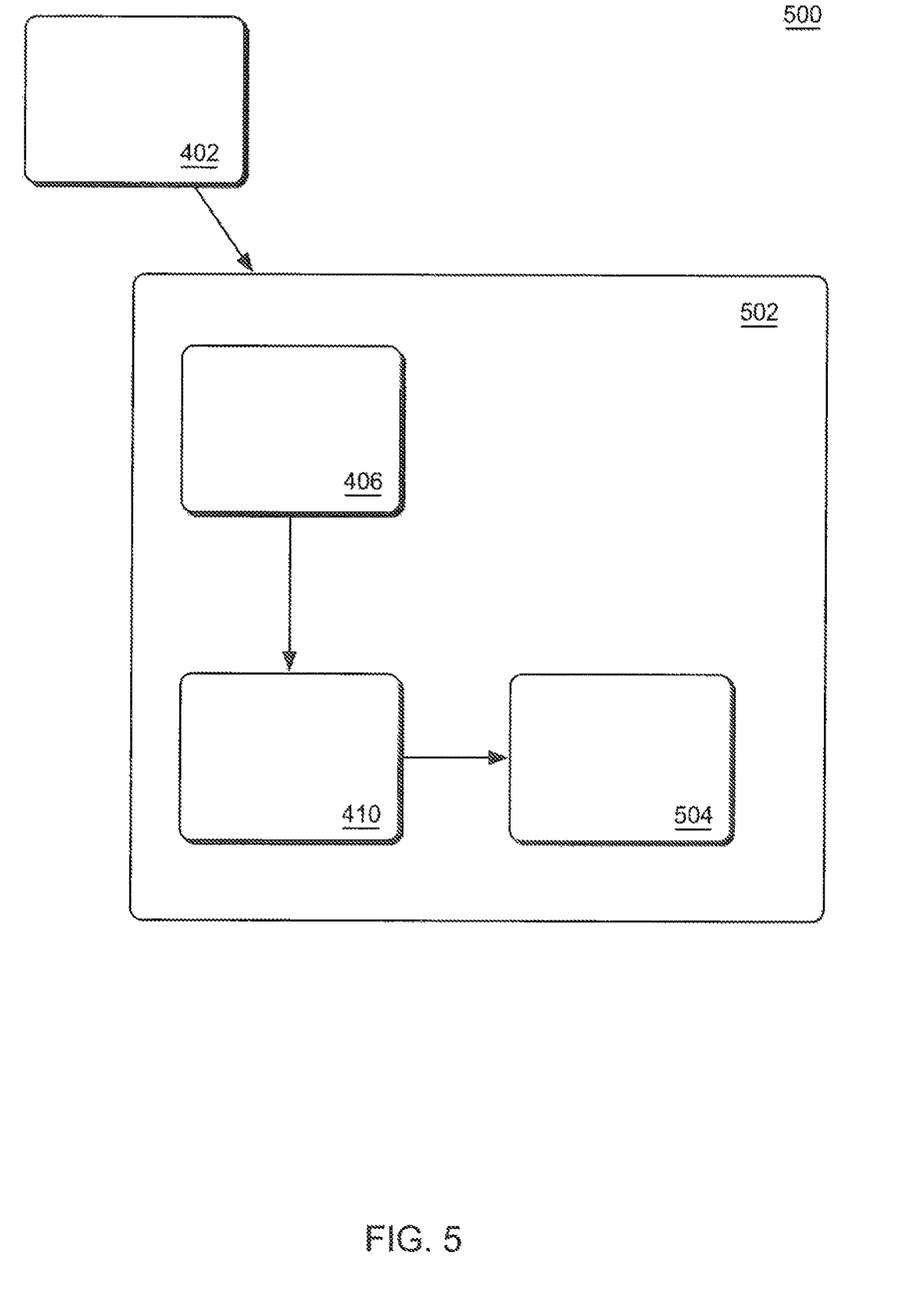
FIG. 5 is a high-level functional block diagram of a portion of sharing and streaming functionality according to another embodiment.

FIG. 5 is a high-level functional process flow diagram of at least a portion 500 of sharing and streaming control system 314 according to another embodiment. Portion 500 comprises a set of instructions for execution by processing device 302 to cause the processing device to perform the functionality specified by FIG. 5.

Portion 500 differs from portion 400 of the FIG. 4 embodiment in the use of an update functionality 502 in place of update functionality 404. Update functionality 502 begins at update website functionality 406, which functionality is described above in conjunction with FIG. 4, and proceeds to update streaming file functionality 410, also described above in conjunction with FIG. 4.

After completion of update streaming file functionality 410, the process flow proceeds to handle web and stream request functionality 504 which combines the functionality of handle web request functionality 408 and handle stream request functionality 412 of FIG. 4. In at least some embodiments, update functionality 502 may be performed using a single processing thread. In at least some embodiments, update functionality 502 may be performed using more than one processing thread.

Figure 6:
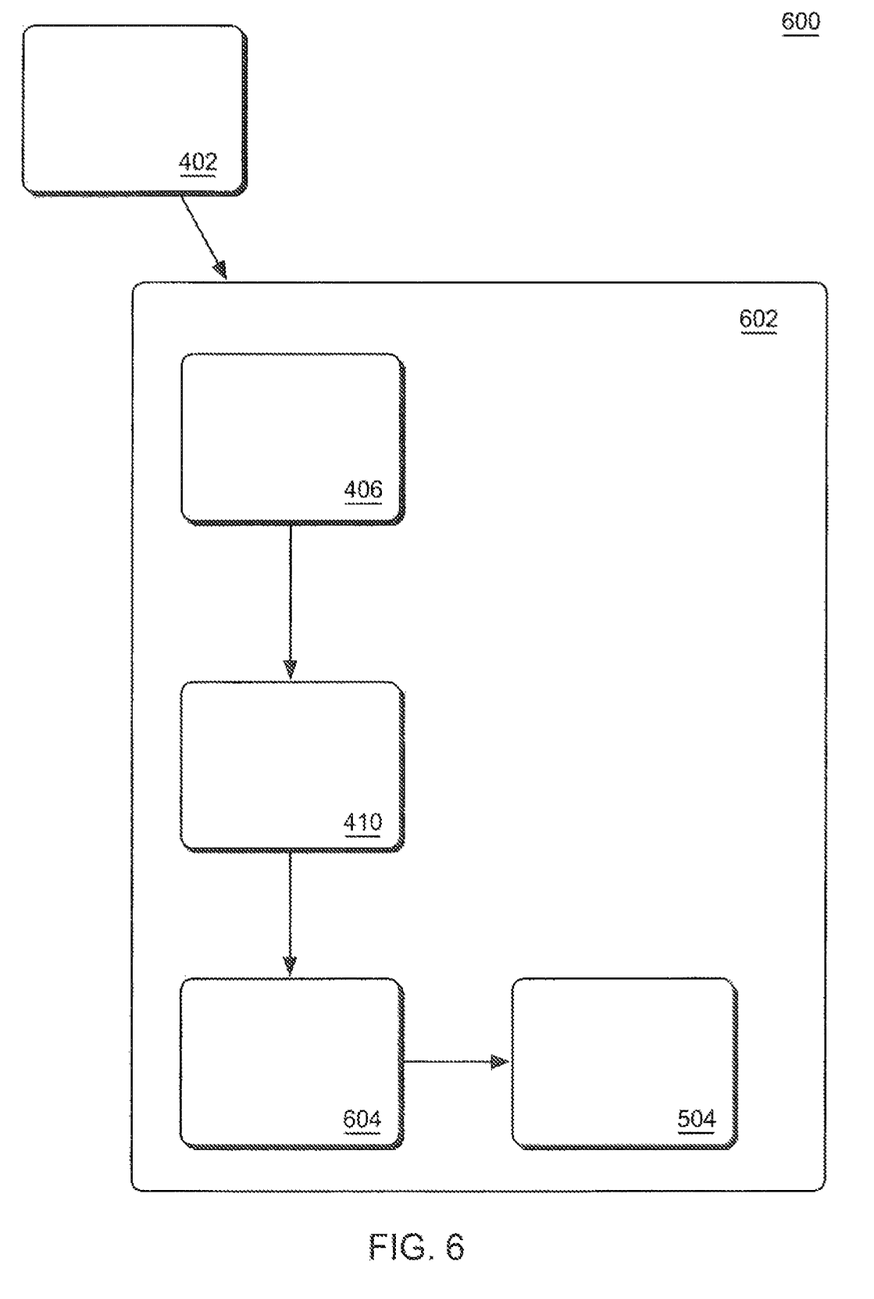
FIG. 6 is a high-level functional block diagram of a portion of sharing and streaming functionality according to another embodiment.

FIG. 6 is a high-level functional process flow diagram of at least a portion 600 of sharing and streaming control system 314 according to another embodiment. Portion 600 comprises a set of instructions for execution by processing device 302 to cause the processing device to perform the functionality specified by FIG. 6.

Portion 600 differs from portion 500 of the FIG. 5 embodiment in the use of an update functionality 602 in place of update functionality 502. Update functionality 602 begins at update website functionality 406, which functionality is described above in conjunction with FIG. 4, and proceeds to update streaming file functionality 410, also described above in conjunction with FIG. 4.

After completion of update streaming file functionality 410, the process flow proceeds to update external site functionality 604 wherein processing device 302 updates external multimedia file sharing sites, e.g., network server 104, based on the received multimedia files. For example, received multimedia files may be uploaded to external photo sharing websites, i.e., websites external to user's home network 102.

After completion of update external site functionality 604, the process flow proceeds to handle web and stream request functionality 504, as described above. In at least some embodiments, update external site functionality 604 may be performed separate from the update and or creation of website or streaming file content functionality described above. That is, the updating of external sites may be performed in a parallel and/or overlapping fashion with respect to the FIG. 5 embodiment.

In at least some embodiments, update web site functionality 406, update streaming file functionality 410 are arranged to execute automatically responsive to receipt of a multimedia file. In at least some embodiments, update external site functionality 604 is arranged to execute automatically responsive to receipt of a multimedia file.

The functions of a method described in connection with the embodiments disclosed herein may be embodied in hardware, software, or a combination thereof. Software comprising instructions for execution may reside in a computer-readable medium comprising volatile and/or non-volatile memory, e.g., a random access memory, a read only memory, a programmable memory, a hard disk, a compact disc, or another form of storage medium readable, directly or indirectly, by a processing device.

What is claimed is:

1. A media server computer comprising:
   a processing device;
   a network interface coupled to the processing device; and
   a storage device comprising:
      executable instructions which, when executed by the processing device, cause the processing device to:
      receive multimedia files;
      in response to the receiving of the multimedia files, generate a website at the media server computer to include the received multimedia files for distribution to a web client;
      in response to the receiving of the multimedia files, update a streaming content at the media server computer to include the received multimedia files for distribution to a streaming client;
      respond to a web request by sending, to the web client, the received multimedia files from the website at the media server computer; and
      respond to a stream request by sending, to the streaming client, the received multimedia files from the streaming content at the media server computer, wherein the stream request is different from the web request.

2. The media server computer of claim 1, wherein the executable instructions further comprise instructions to cause the processing device to update a second website at a remote server computer to include the received multimedia files for distribution, the remote server computer being separate from the media server computer.

3. The media server computer of claim 2, wherein the second website is located external of the media server computer, and wherein the instructions to cause the processing device to update the second website comprise instructions to cause the processing device to update the second website using the network interface.

4. The media server computer of claim 1, wherein the media server computer is a network attached storage device.

5. The media server computer of claim 1, wherein the executable instructions which cause the processing device to update the streaming content comprise instructions to cause the processing device to create the streaming content.

6. The media server computer of claim 1, wherein the executable instructions when executed respond to the web request by serving the website at the media server computer to the web client.

7. The media server computer of claim 1, wherein the executable instructions comprise:
- a first thread that when executed by the processing device cause the processing device to perform the generating of the website at the media server computer, and the responding to the web request; and
- a second, different thread that when executed by the processing device cause the processing device to perform the updating of the streaming content at the media server computer, and the responding to the stream request.

8. A method of distributing multimedia files using a media server computer, comprising:
- receiving, by the media server computer, the multimedia files;
- responsive to the receiving of the multimedia files, creating, at the media server computer, a website to include the received multimedia files for distribution to a web client;
- responsive to the receiving of the multimedia files, updating, by the media server computer, a streaming content at the media server computer to include the received multimedia files for distribution to a streaming client;
- responding, by the media server computer, to a web request by sending, to the web client, the received multimedia files from the website at the media server computer; and
- responding, by the media server computer, to a streaming client request by streaming the received multimedia files from the streaming content at the media server computer to the streaming client, the streaming client request different from the web request.

9. The method of claim 8, wherein the creating of the web site and the updating of the streaming content are executed by different processing threads in the media server computer.

10. The method of claim 8, wherein responding to the web request comprises serving the website at the media server to the web client.

11. The method of claim 8, further comprising:
- responsive to the receiving of the multimedia files, updating, by the media server computer, a second website at a remote server computer to include the received multimedia files, wherein the remote server computer is separate from the media server computer.

12. The method of claim 8, further comprising:
- executing, in the media server computer, a first thread that performs the creating of the website at the media server computer, and the responding to the web request; and
- executing, in the media server computer, a second, different thread that performs the updating of the streaming content at the media server computer, and the responding to the stream request.

13. A non-transitory computer-readable medium storing instructions which, when executed by a processing device, cause the processing device in a media server computer to:
- receive multimedia files;
- responsive to the receiving of the multimedia files, create a web site at the media server computer to include the received multimedia files for distribution to a web client;
- responsive to the receiving of the multimedia files, update a streaming content at the media server computer to include the received multimedia files for distribution to a streaming client;
- respond to a web request from the web client by sending, to the web client, the received multimedia files from the website at the media server computer; and
- respond to a stream request from the streaming client by sending, to the streaming client, the received multimedia files from the streaming content at the media server computer, wherein the stream request is different from the web request.

14. The non-transitory computer-readable medium of claim 13, wherein creating the web site and updating the streaming content are arranged to execute automatically upon receipt of the multimedia files.

15. The non-transitory computer-readable medium of claim 13, wherein the instructions when executed respond to the web request by serving the website at the media server computer to the web client.

16. The non-transitory computer-readable medium of claim 13, wherein the instructions when executed cause the processing device in the media server computer to:
- responsive to the receiving of the multimedia files, update a second website at a remote server computer to include the received multimedia files, wherein the remote server computer is separate from the media server computer.

17. The non-transitory computer-readable medium of claim 13, wherein the instructions when executed cause the processing device in the media server computer to:
- execute a first thread in the media server computer, the first thread performing the creating of the website at the media server computer, and the responding to the web request; and
- execute a second, different thread in the media server computer, the second thread performing the updating of the streaming content at the media server computer, and the responding to the stream request.

* * * * *

UNITED STATES PATENT AND TRADEMARK OFFICE
CERTIFICATE OF CORRECTION

PATENT NO. : 10,382,523 B2  
APPLICATION NO. : 13/054805  
DATED : August 13, 2019  
INVENTOR(S) : Eric Peterson et al.

Page 1 of 1

It is certified that error appears in the above-identified patent and that said Letters Patent is hereby corrected as shown below:

In the Claims

In Column 7, Lines 33-34 (approx.), Claim 9, delete "web site" and insert -- website --, therefor.

In Column 8, Line 8, Claim 13, delete "web site" and insert -- website --, therefor.

In Column 8, Line 24, Claim 14, delete "web site" and insert -- website --, therefor.

Signed and Sealed this  
Twenty-ninth Day of October, 2019

Andrei Iancu  
*Director of the United States Patent and Trademark Office*